INVENTORS.
ARTHUR SINCLAIR TAYLOR
ELLSWORTH SANDHAGE
GEORGE BOTT
WILLIAM KONAZEWSKI
BY

Samuel Branch Walker

ATTORNEY

INVENTORS.
ARTHUR SINCLAIR TAYLOR
ELLSWORTH SANDHAGE
GEORGE BOTT
WILLIAM KONAZEWSKI
BY

ATTORNEY

United States Patent Office 3,453,804
Patented July 8, 1969

3,453,804
STOPPERING MECHANISM
Arthur Sinclair Taylor, Spring Valley, and Ellsworth Sandhage, Pearl River, N.Y., and George Bott, Westwood, N.J., and William Konazewski, Pearl River, N.Y., assignors to American Cyanamid Company, Stamford, Conn., a corporation of Maine
Filed July 5, 1966, Ser. No. 562,620
Int. Cl. B65b 7/28, 3/04; B67b 1/04
U.S. Cl. 53—264                                    8 Claims

ABSTRACT OF THE DISCLOSURE

A stoppering device is provided with a bowl feeder which orients stoppers and moves them into contact with a horizontal transfer wheel. The horizontal wheel is positioned so that successive stoppers are introduced into the depressions of a rotating vertical stopper wheel. Each depression is supplied with source of vacuum and has a retractable plunger. As each stopper on the vertical wheel reaches a position over a container, the plunger is forced outwardly thus forcing the stopper into the container.

*Background of the invention*

The problem of filling containers such as small vials with biologicals, such as vaccines, diagnostic agents, antibiotics, and the like, has presented a number of very serious problems. The most serious perhaps is the necessity for maintaining the whole operation under conditions of sterility. This has required extreme precautions in practice, and also when part or all of the operations are effected batch-wise and particularly manually, output suffers severely and cost is greatly increased. Up to now there has not been available a practical, all-automatic, continuous, sterile vial filling unit which eliminates handling of the vials by hand during operation. Because it is perhaps the single most important advantage of the present invention in its general organizational aspect that complete sterility can be maintained without compromising output and without requiring additional steps requiring expensive hand labor, the present invention will be described more particularly in connection with the filling of containers with biologicals under sterile conditions. It should be understood, however, that the production unit of the present invention in its broader aspects, as well as individual equipment used in the production unit, may be employed for the filling of other materials into containers even though they may not be of such nature as to require a completely sterile environment.

*Summary of the invention*

The present invention, "which is specifically claimed in the present application with respect to the vial stoppering operation," in addition to the major possibility of completely sterile operation, also effects important economies in production costs per container, accuracy of container filling and the like, regardless of whether the operation has to be carried out under completely sterile conditions. Also, it should be noted that individual elements going into the production unit, such as loading, vial filling, vial stoppering, and final automatic loading operations can be used by themselves without being part of the production unit which forms the subject matter of the organizational aspect of the present invention. They will be described in conjunction with the production unit, but the present invention is not limited thereto and they constitute separate, specific aspects or sub-combinations of the invention.

It is advantageous to provide continuous operation of the production line unit, using this term in its practical sense, namely for automatic operation at least through a relatively long cycle, such as for example the filling of a tray of vials and stoppering them, where the tray has a relatively large capacity, such as for example 1,000 or more vials. Within such a relatively long cycle the operation is continuous. Also, it should be understood that while certain of the individual elements of the present invention are operated continuously, certain other elements are operated automatically intermittently, but the net effect of the whole production line is a continuous production. Therefore, this description is intended to apply to operations in which the overall result is continuous even though certain individual steps or elements may be intermittently performed.

One may consider that the automatic, and essentially continuous, filling of containers involves a certain general sequence of operation, including loading of containers in the proper sequence and orientation, precise filling with a predetermined amount of liquid, insertion of stoppers either completely, or partially, where escape of vapors in subsequent treating operations is required, such as for example with materials which are to be vacuum freeze dried, and finally, counting and loading the filled, stoppered containers into suitable loading units, such as trays. The description of the invention will follow this general sequence, and the preferred automatic, essentially continuous operation of the production unit or line by control of some of the steps, such as for example filling, from other operating steps or elements, such as the claimed stoppering, is effected.

*Description of the preferred embodiments*

The general organization or production line will be specifically described in conjunction with the loading and the claimed stoppering of small vials with biological liquids under conditions of sterility. As can be seen on FIG. 1A, sterilized vials, open end up, are loaded from trays 1 onto a slowly rotating plate 2 which forms part of a conventional bottle loader which, in conjunction with the usual fenced track 3 at one point of its periphery, aligns the vials in what is hoped to be uniform single file. The conventional loader, parts of which are used in the present invention, is also provided with a new anti-bridging device, which will be described in more detail below in connection with FIGS. 2 and 3, and which prevents bridging and hence empty spaces in the line of vials formed.

Figure 1A:
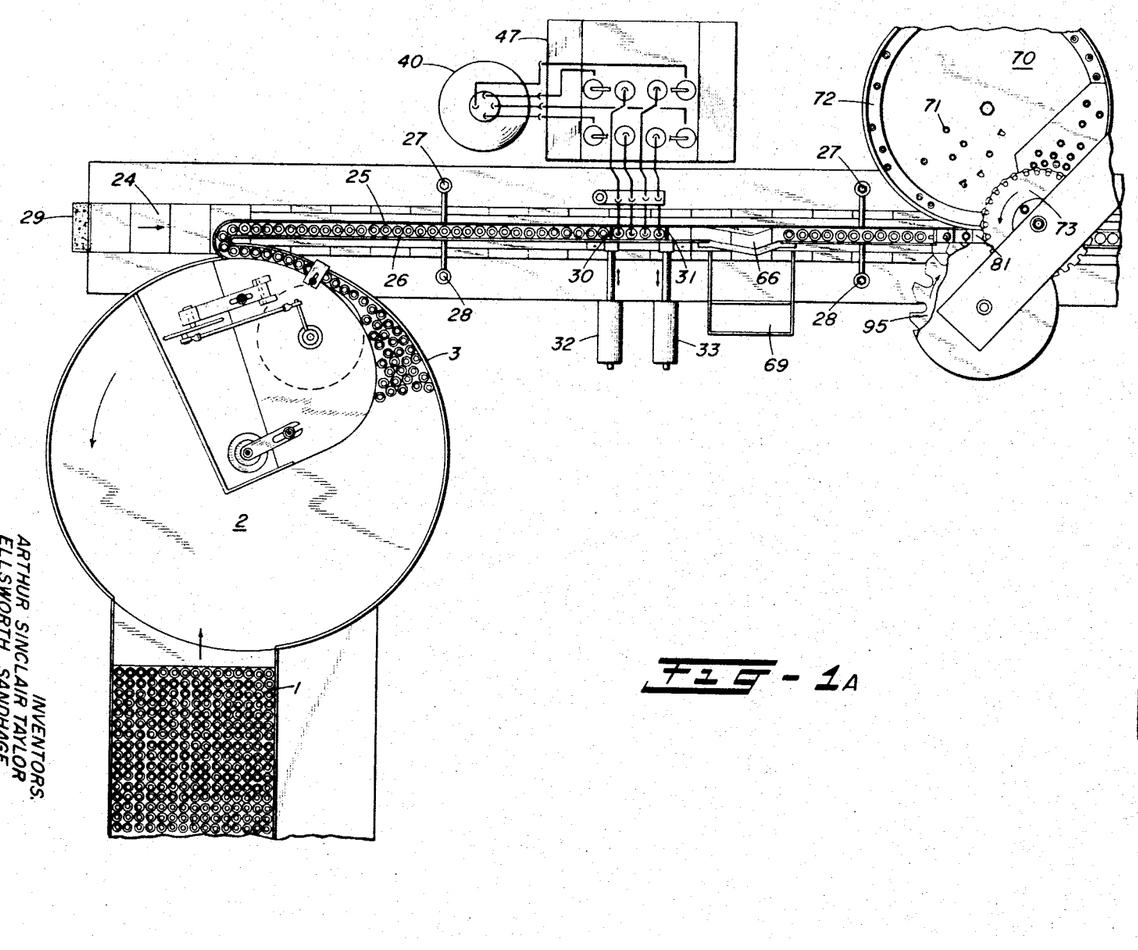
FIGS. 1A and 1B are a plan view, extended over two sheets of drawings, of the whole production line.
Figure 1B:
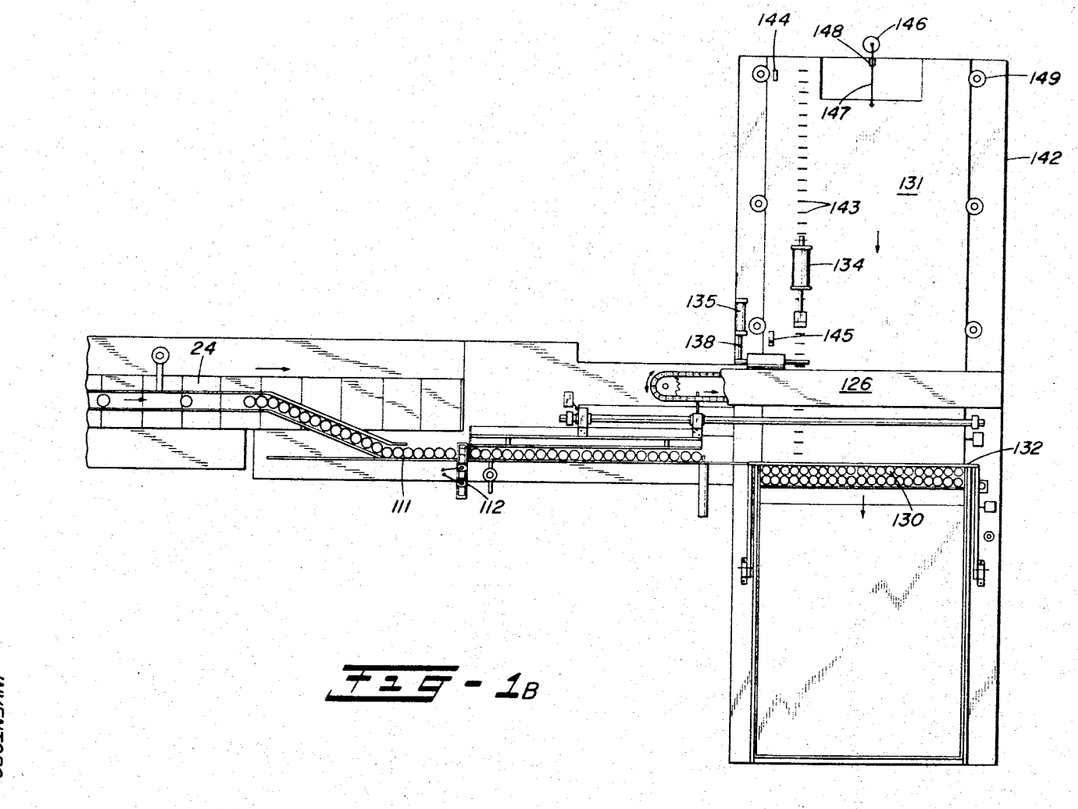

A whole tray of vials, for example containing 1200, are moved onto the slowly rotating plate 2 of the vial loader by pushing in the conventional manner. FIG. 1A shows a full tray ready to be pushed onto the loader. This portion of the loader is not new with the present invention and is, therefore, shown diagrammatically. The vials are pushed through a low opening into the loader, which is covered, as is all of the production unit track, and this permits the maintenance of sterile conditions in ways which are, in themselves, known. Thus, for example, sterilizing ultraviolet radiation from suitable sterilamps, maintenance of a slight positive pressure of filtered and preferably sterile air and the like. As these procedures are well known, they are not specifically illustrated, and therefore FIGS. 1A and 1B show the production line with the cover removed so that the successive operations are clearly shown.

Figure 3:
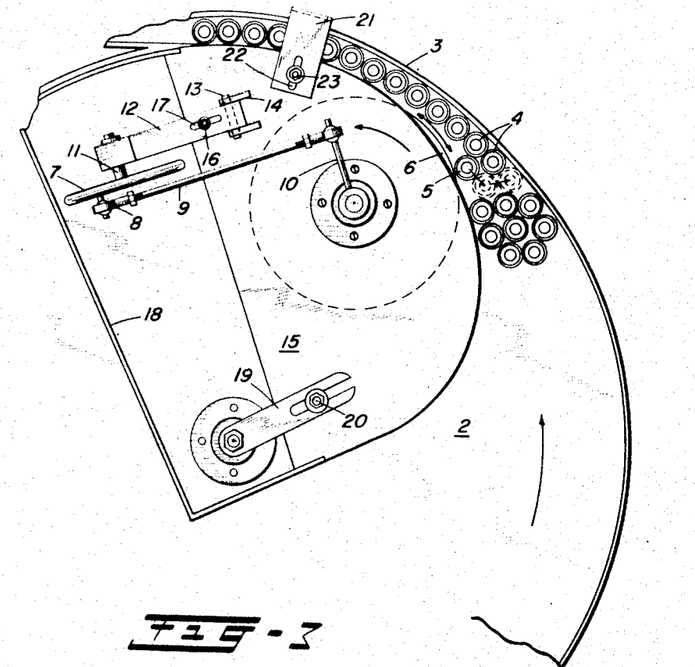
FIG. 3 is a plan view of a portion of the empty container loading mechanism showing the anti-bridging device of FIG. 2 in plan.

FIG. 3 shows, on an enlarged scale, the phenomenon of bridging, which occurs with conventional vial loaders. As the vials are urged by the slowly rotating loader plate 2 against the guiding fence 3 at the periphery, some vials can wedge themselves between two other vials to form a triangle. This is shown in FIG. 3 with two vials which are in the proper direction of the track shown at 4 and the slightly offset vial touching them 5 forming a bridge. This phenomenon is, therefore, known as bridging and is the bane of conventional vial loaders and aligners.

Figure 2:
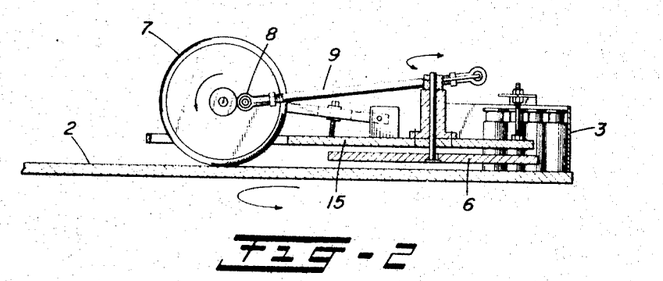
FIG. 2 is a vertical section of the drive of an anti-bridging mechanism for empty container loading.

In FIG. 1A, and in detail in FIGS. 2 and 3, a new anti-bridging element is shown. This is a small circular plate 6 with its axis eccentric to the axis of the main loading plate 2. It is oscillated through a small arc by a drive wheel 7 which rolls on the plate 2. The wheel 7 is provided with a projection 8, eccentrically located, on which a crank arm 9 is journaled. This in turn oscillates the anti-bridging plate 6 through another crank arm 10. The drive wheel 7 is provided with an axle 11 which is journaled in an arm 12, this arm being provided at its other end with a pin 13 which is rotatable in a mounting 14 on a frame or plate 15. Pressure of the wheel 7 against the plate 2 is provided by the bolt 16 which passes through a slot 17 in the arm 12. The framework 15 is also adjustably mounted on a second framework 18 through the slotted arm 19 with bolt 20 and is supported at another point by a second arm 21 which rests on the fence 3. This arm is also provided with a slot 22 and bolt 23 so that the exact position of the anti-bridging plate can be accurately fixed in accordance with different vial sizes. It will be seen from FIGS. 2 and 3 that the anti-bridging plate 6, which is between the framework 15 and the main rotating loader plate 2, projecting slightly beyond the framework 15 and so, when properly adjusted, its oscillation will roll a bridging vial into line. This completely solves the bridging problem and assures that the vials are lined up in single file and are moved onto a moving conveyor belt 24 as is shown on FIG. 1A.

On the conveyor 24, which has a very smooth surface and may, for example, be formed of polished metal plate links, the vials are moved in the direction of the arrow between two guide rails 25 and 26 which form a track only slightly wider than the diameter of a vial. Track alignment is maintained adjustably by the screws 27 and 28 and can be adjusted simply for vials of different size. A sponge 29, which is preferably kept soaked with disinfectant, serves to wipe off any spillage on the conveyor 24 and to maintain it in a disinfected state.

As the vials move along their track they reach a fence 30 and a second fence 31. The fences are controlled in synchronism with the filling mechanism, which will be described further below, pneumatically or hydraulically by means of the cylinders 32 and 33. First the fence 31 is inserted, which stops the movement of the file of vials, and then the fence 30. Between them they hold in the track a predetermined number, as illustrated four, vials for filling. The conveyor 24 continues to move, but its smooth surface is such that it slides easily along the bottoms of the empty vials and does not cause any sticking. The movement of the conveyor 24 is continuous, as is that of the loading plate 2, and is not started and stopped by signals from any of the mechanism further along the line. The selection and retention of the four vials to be filled is brought about by the fences 30 and 31.

Figures 4, 5:
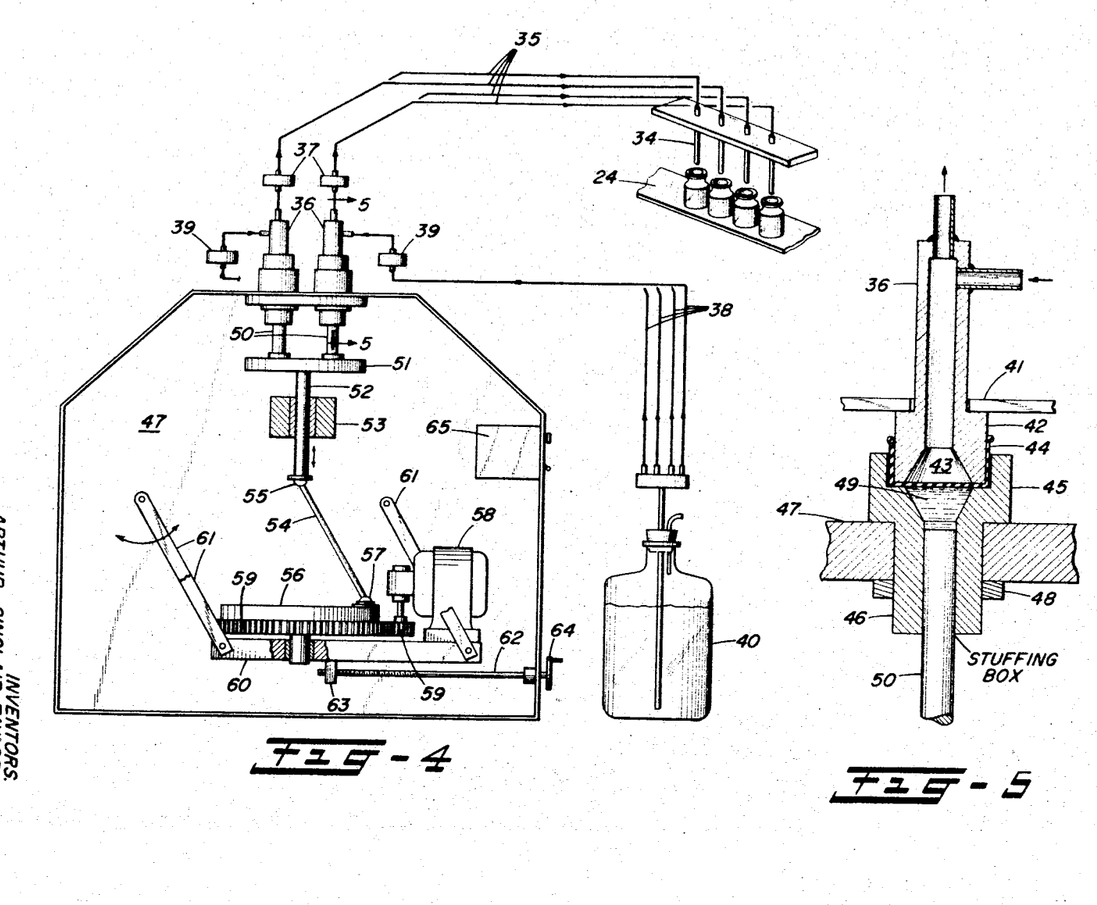
FIG. 4 is an isometric view, partly in section, of the container filling mechanism.
FIG. 5 is a detailed section along the line 5—5 of FIG. 4.

The filling station, which includes a novel subcombination of elements which constitute the claimed part of the present invention, is illustrated in FIGS. 4 and 5. The four vials are shown on the conveyor 24 in the upper right-hand corner of the figure, but for simplicity the track and the two fences 30 and 31 are omitted. These serve, of course, to hold the four vials rigidly in position during the filling operation.

There are four filling nozzles 34 which are connected through four lines 35, shown diagrammatically, to four pumps 36, two of which appear in FIG. 4 and one of which is shown in greater detail in the enlarged section of FIG. 5. Suitable check valves 37 are in each line to prevent backflow of liquid in the lines 35. Each pump chamber 36 is connected through its own inlet line 38 through check valve 39 to a bulk supply of biological shown in a container 40. Each pump chamber 36 is held against vertical movement by a frame or plate 41, which is shown in FIG. 5. This is eliminated from the view in FIG. 4 in order not to obscure the illustration. The frame or plate 41 engages a shoulder of an enlarged portion 42 of each pump chamber. In this enlarged portion a tapering enlarged bore 43 forms a frustoconical chamber of predetermined dimensions.

The enlarged portion 42 of each pump chamber is surrounded by a cap 44, which may be of rubber or any other suitable elastomer. The whole fits tightly in an enlarged portion 45 of pumping elements 46 which are mounted in the cover 47 surrounding the whole of the mechanism. Locking is effected by a suitable locking plate 48. Each enlarged head 45 has a second frustoconical chamber of approximately the same shape as 43 in the pump chamber itself. This is filled with a suitable liquid 49, which may be water, oil or any other incompressible liquid. In the restricted bores of the members 46 there are accurately dimensioned pistons 50. Each piston is of the same cross section. Means are provided to prevent leakage of liquid around the piston rods 50, which can be associated with conventional stuffing boxes as indicated in FIG. 5. They are, however, not shown as they would interfere with the clarity of the illustration.

All four piston rods 50 are mounted in a rigid plate 51 which in turn is mounted on a single rod or shaft 52 journaled in a journal 53. The double arrow in FIG. 4 indicates the oscillating travel of this shaft. At its lower end it is connected to a rigid rod 54 through a ball and socket joint 55. The other end of the rod is mounted on a rotating plate 56 through a second ball and socket joint 57. This plate is rotated by the motor 58 through gears 59 and is journaled in a plate or framework 60. This framework is capable of lateral movement but cannot tilt. The lateral movement is determined by the four parallel arms 61 which are journaled in the cover 47. In FIG. 4 two of these arms are shown in full and two broken away. The arc of movement is indicated by the curved double arrow. The lateral position of the framework or plate 60 is determined by the threaded rod 62 which is threaded into a projection 63 on the framework. The rod can be turned from outside of the wall 47 by means of the hand wheel 64. Adjustment of the position of the framework 60 determines the stroke of the rod 52, which is variable in order to pump different amounts of liquid 49 depending on the adjustment of the wheel 64. It will be noted that there is an additional advantage that the whole mechanism within the wall 47 is kept from contact with the outside, which aids in preventing contamination. Access to the mechanism for periodic maintenance is through an opening (not shown).

It will be noted that the lowermost position of the rod 52 and therefore the pistons 50 is fixed regardless of adjustment of the hand wheel 64. Movement of the framework 60 results in a vertical displacement so that the lowermost position of the rod 52 remains fixed. In other words, the variation in the stroke of the pistons 50 is brought about by the change in the topmost position which they reach with different lateral adjustments of the position of framework 60. A single adjustment by the hand wheel 64 effects this change or adjustment in the amount of liquid 49 pumped without requiring any second adjustment of the lowermost position that the rod 52 reaches. This is a practical advantage as varying volumes of liquid can be pumped with a single adjustment instead of requiring more than one as in many other filling devices. Adjustment is simplified and complication is reduced to a minimum, which is a practical and important operating advantage. Another advantage that adds to simplicity and reliability is that the pumping mechanism which pumps liquid 49 has no valves, which reduces risk of leakage or other malfunction. The present invention should therefore not be confused, as far as the filling operation is concerned, with more complicated pumping mechanisms which require valves.

When a set of four vials are to be filled, a single revolution of the plate 56 causes the eccentrically located ball joint 57 to impart an upward and downward movement to the rod 52. This causes the four pistons 50 to move up and down a definite amount which is accurately adjusted by the wheel 64 to correspond to a particular volume which is to be filled into each vial. This is the only adjustment required. On the down stroke the elastic diaphragm 44 is pulled down to a horizontal position, which sucks up liquid from the container 40 into each pump chamber. On the return up stroke an amount of liquid in each pump chamber 36, exactly corresponding to the volume of liquid 49 moved by the piston 50, is pumped out through the check valves 37, lines 35 and orifices 34. This accurately measured volume is thus transferred to each vial.

The motor 58 runs continuously but its cycle is adjusted by the controller 65 to a rate somewhat greater than the time for stoppering four vials by the stoppering mechanism which will be described below. One might say, therefore, that there is a rough synchronism between the two operations, although exact synchronism is not required.

It should be noted that the pumping mechanism, including the fluid 49, does not come into contact with the biological which is pumped into the vials. There is a complete separation of the two systems by the elastic caps 44. Sterility can therefore be maintained and there is no possibility of either leaks or contamination. At the same time, the caps 44 can be removed for cleaning and disinfecting, for example when a different biological is to be filled in, and of course at such time can be replaced if desired. These elastic caps are relatively cheap, but they do have a long life and so there is no risk of their failing by attempting to run them too near their normal life span. These features which maintain complete sterility and at the same time completely accurate measuring out of the volumes filled into the vials are one of the most important advantages of the present invention, particularly in its aspect as a sub-combination including the filling mechanism.

Another advantage is that the pressure of liquid over the elastic diaphragms 44 is uniformly distributed, and since it is incompressible an exactly measured amount is pumped each time. There is no problem of varying pressure by flexing of a diaphragm as in an ordinary diaphragm pump and thus, although it may appear at first sight as if the pumps described above resemble ordinary diaphragm pumps, they actually operate under a different system, namely a perfectly uniform transfer of movement without any non-uniform flexing of the diaphragm. Ordinary diaphragm pumps, while they would perhaps maintain sterility as long as the diaphragms did not break, will not perform the exact measuring that is effected in the present invention because the diaphragms are moved from portions and are therefore not subjected to a perfectly uniform liquid pressure over the whole of their surface. At the same time, one of the advantages of ordinary diaphragm pumps, namely that they can handle suspensions of solids and liquids, is fully maintained. In other words, the present invention not only performs a new result of completely accurate measurement under sterile conditions, but this is obtained without any disadvantage and thus the present invention is suitable for filling suspensions of solids in liquids as well as pure liquids. This is a practical advantage as some biologicals or other liquid materials do contain solids suspended therein.

After the four vials have been filled, the fence 31 is retracted on command of the filling mechanism and the four vials proceed to move forward in their track on the conveyor belt. When all four have passed the location of the fence 31 the latter is moved forward and fence 30 is withdrawn so that another set of four vials may move under the filling nozzles and the filling sequence described above is then repeated.

Figure 6:
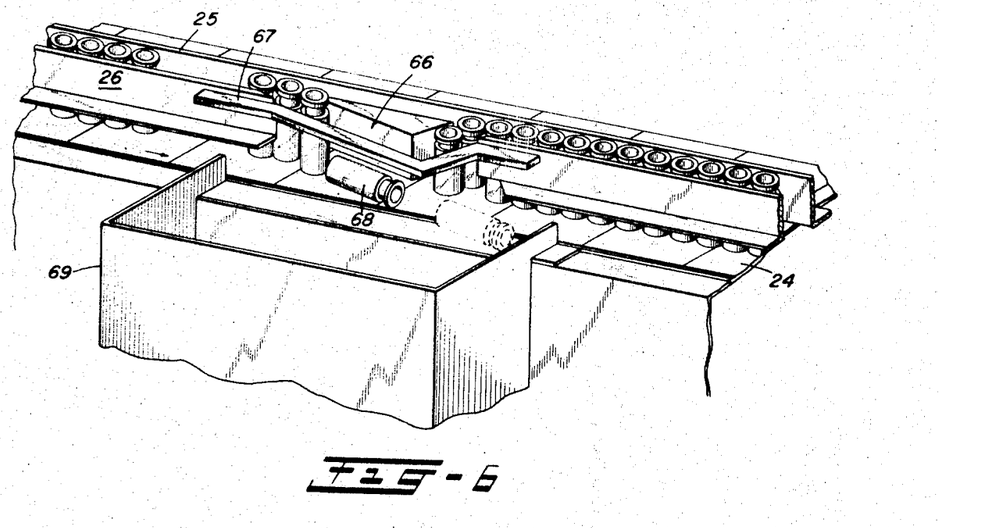
FIG. 6 is an elevation of the tipped over container rejecting mechanism.
Figure 7:
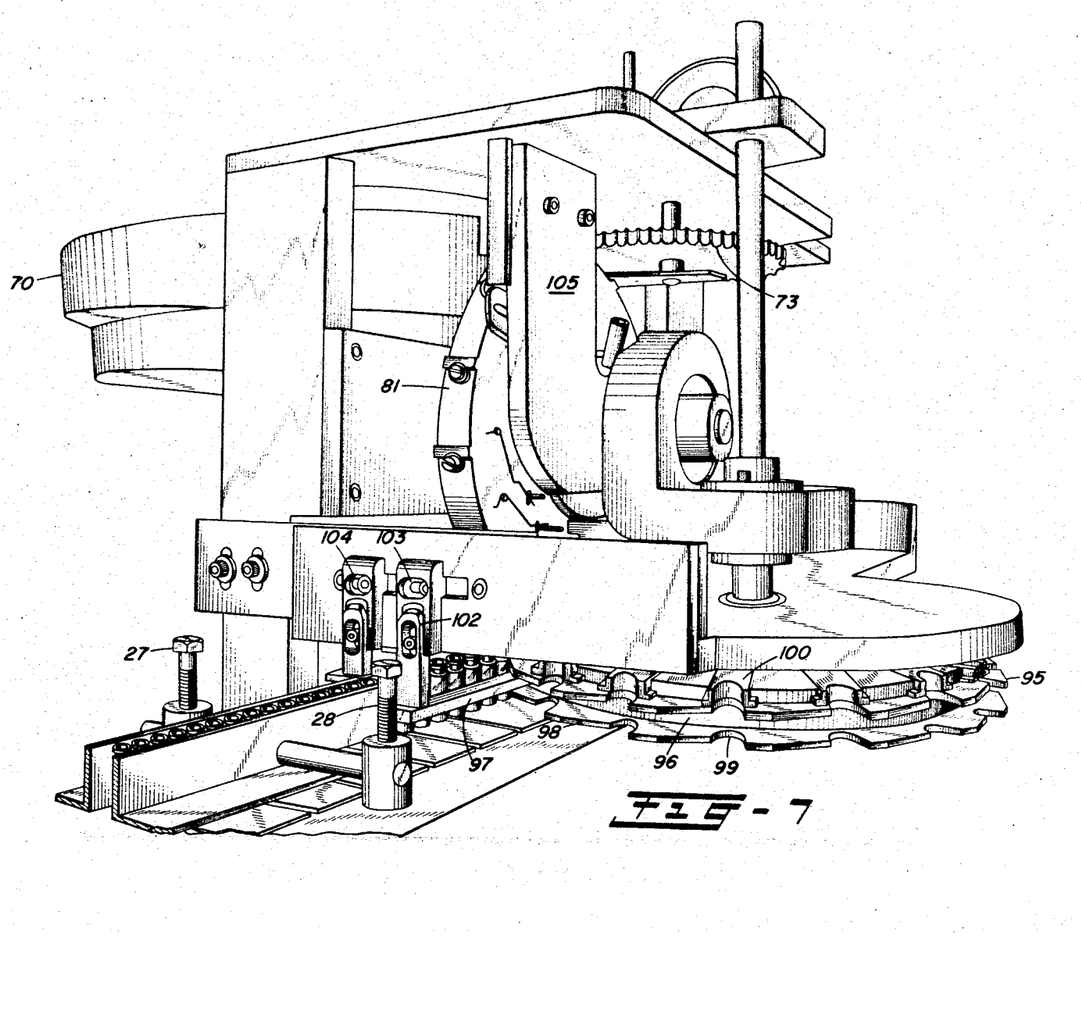
FIG. 7 is an elevation of the stoppering mechanism.

The four vials now move to a portion of the track which provides discarding of vials which may have tipped over. This location, which is an abrupt jog, is shown at 66 in FIG. 1A and is illustrated in greater detail in FIG. 6. At the start of the jog the outer fence 26 is developed into a portion 67 which contacts the upper parts of the vials but which leaves a space between it and the conveyor 24 that is greater than the diameter of the largest vial which is to be filled on the machine. As a result, if a vial tips and falls on its side, as is shown at 68, the conveyor belt causes it to slide underneath the portion 67 of the fence, and it is discharged into a bin 69. This position is shown in dashed lines in FIG. 6. The vials which have remained upright are of course held by the upper portion of the fence 67 and move on in their regular single file, as can be seen at the right of FIG. 6. Theoretically the fence and the smooth surface of the conveyor belt should preclude any vial tipping, and in practice this holds true for most vials. However, in a large run an occasional one will tip, and the discharge location 66 takes care of this situation. It will be noted that if a vial tips onto its side the liquid will be discharged onto the conveyor belt, and this will move along the surface of the conveyor belt until it has reached the sponge 29, where it is wiped off and the disinfectant in the sponge assures the maintenance of a sterile environment on the conveyor belt.

As has been pointed out above, the automatic ejection of tipped or improperly oriented containers may be before the filling station instead of after or in addition thereto. The mechanism is, of course, the same in its structure regardless of whether it is located in the portion of the track before or after the filling station. Therefore, no ejection means is shown on the drawings before the filling station as this would result in obscuring the drawing and would not add any information since it would involve merely a duplication of the mechanism at the discharge location 66. In a practical operating machine there is considerable advantage in automatically ejecting improperly oriented vials both before and after filling, and in such a machine of course the ejection mechanism is duplicated at the other position.

At this point it is of interest to note that it is possible to operate multiple lines of vials. This requires, of course, filling two tracks, doubled filling mechanisms as described above, duplicated tipped vial discharge points, and duplication of the stoppering mechanism which will be described below. Also, some minor modifications in the final loading of stoppered vials are then required, as will be mentioned later. No problem is presented by the fences 30 and 31 because they move in from the outside, and of course the waste bins for tipped vials, shown in FIG. 6, can be on the outside for each of the lines. Theoretically more than two lines could be filled at the same time, which would require operating fences 30 and 31 from the top or otherwise providing for location of multiple actuating cylinders. The capacity of the system of the present invention is so high that adequate output is obtained with a single line, although in certain cases two lines can be filled simultaneously. The above discussion is primarily for the purpose of emphasizing that the present invention is not limited to filling a single line of containers or even a pair of lines.

After passing the portion of the track 66, the row of vials reaches the stoppering mechanism. The location of this mechanism appears on FIG. 1A, but the description of the actual stoppering mechanism is best understood in conjunction with FIGS. 7 to 13. First, however, reference will be made to the loading of stoppers in conjunction with FIG. 1A. There is a continuously oscillated loading plate 70 which moves stoppers 71 up inclined ramp 72 into single file properly oriented with their tops down. The forward oscillation is slow and the return rapid. This kind of loader is not new with the present invention and is usually called a vibratory bowl feeder. The loader for empty vials in FIGS. 1A, 2 and 3 is also not new, except for the anti-bridging mechanism. Since the bowl feeder is a known mechanism, its details are not shown in FIG. 1A.

Figure 10:
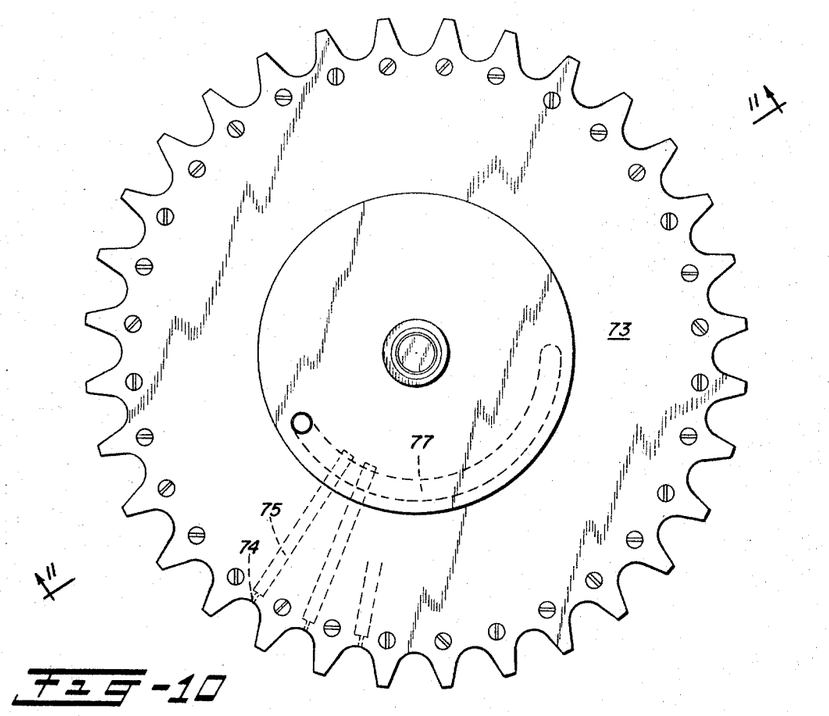
FIG. 10 is a plan view of the stopper transport wheel of FIG. 7.
Figure 11:
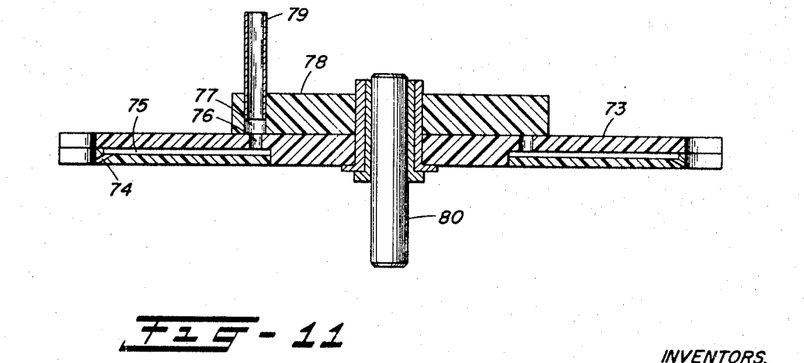
FIG. 11 is a section along the line 11—11 of FIG. 10.

The stoppers are moved into contact with a wheel 73, having scallops or teeth at its periphery of suitable size to receive a stopper. The rotation of this wheel and its relation to the bowl feeder 70 are best seen in FIG. 1A, but the construction of the wheel is illustrated more clearly in FIGS. 10 and 11. At the base of each scallop there is a small port 74 connecting to a larger passageway 75. This is shown in dashed lines on FIG. 10 for several scallops and appears clearly in the sectional view of FIG. 11. At the ends of the passageways 75, they are provided with short connections 76 which can communicate with a groove or channel 77 in a stationary plate 78. This groove extends for approximately half a circle, as can be seen in FIG. 10. It communicates through an inlet conduit 79 with a source of vacuum (not shown). The plate 73 is turned by a shaft 80 driven in synchronism with the other elements of the stoppering mechanism.

Figure 8:
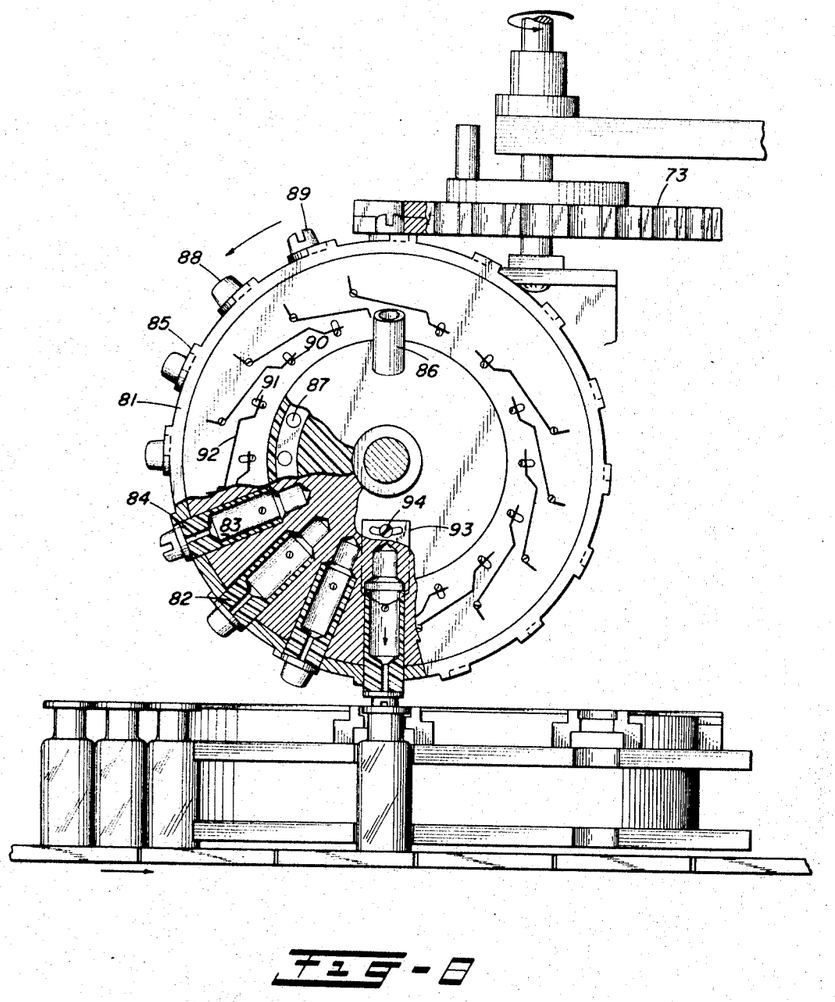
FIG. 8 is a similar elevation, partly broken away and shown in section, of the stoppering mechanism taken at right angles to FIG. 7.
Figure 9:
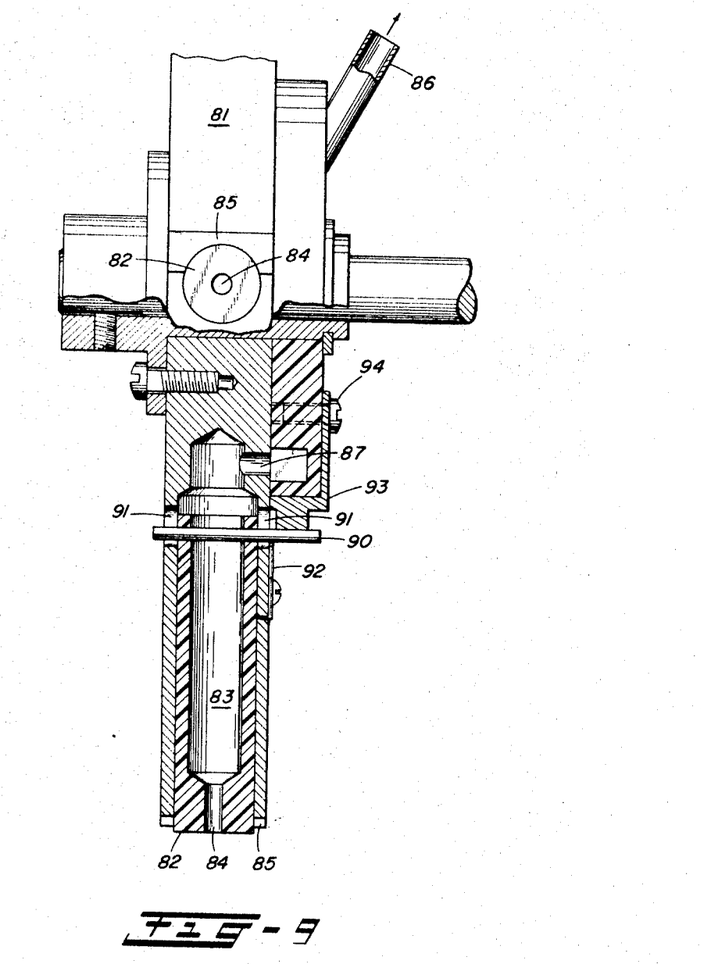
FIG. 9 is an elevation, partly broken away and in section, of a detail of one of the stopper carrying elements shown in FIG. 8.

The vacuum in the scallops holds the stoppers for approximately half of the wheel circumference until the stoppers come over a vertical wheel 81. This is best seen on FIG. 8, although the general relationship with other elements of the stoppering mechanism is also apparent from FIG. 7. The periphery of the wheel 81 is provided with uniformly placed openings in which hollow plungers 82 can reciprocate. Each plunger has a hollow center 83 connected to its face through a channel 84. The periphery of the wheel 81 also has curved shoulders which define partially depressions 85 when the plungers are in retracted position. The central body is connected to a source of vacuum through a conduit 86 and communicating openings 87. As can be seen in FIG. 8, as the wheels 81 and 73 turn, stoppers are successively transferred from the wheel 73 to the depressions partially defined by the shoulders 85 on wheel 81. At the point where the two wheels meet vacuum is released from the scallops on 73, as will be apparent from FIG. 8, and the suction through the channels 84 in the plungers 82 suck the stoppers tightly against the end of each plunger. The shoulders 85 further aid in preventing the stoppers from slipping out of position as the wheel 81 turns.

The present invention can handle any stopper of suitable size and they may be solid stoppers, such as illustrated at 88, or slotted stoppers, as shown at 89. Of course in any run of vials one kind of stopper would be used, but both kinds are illustrated in FIG. 8. The solid stoppers are for vials which are to be tightly stoppered and the slotted ones for vials which are to be subjected to a treatment which causes escape of vapors, such as freeze drying. Obviously, of course, after this latter operation has been performed the split stoppers are then forced in further, but this is an operation which has nothing to do with the present invention. It is only mentioned as an example of the versatility of the present invention, which can handle various designs of stoppers.

Each plunger 82 is provided with a pin 90 extending through a slot 91 and held in its normally retracted position by a spring 92. As the wheel 81 reaches the position immediately above a vial, which is held rigidly, as will be described below, the pin 90 of the plunger contacts a cam 93 and is moved out, inserting the stopper partially into the vial, as is shown in FIG. 8. The cam is detachable, being held by a bolt 94. This permits substituting a different cam if the plunger is to be moved a greater distance, for example if the stoppering was with solid stoppers instead of slotted stoppers, the former having to be pushed all the way in. An examination of FIG. 9 will show that when the plunger 82 is moved down, vacuum is cut off from the center of the plunger and therefore this will not tend to pull the stopper back out from the vial as wheel 81 moves on.

Figure 12:
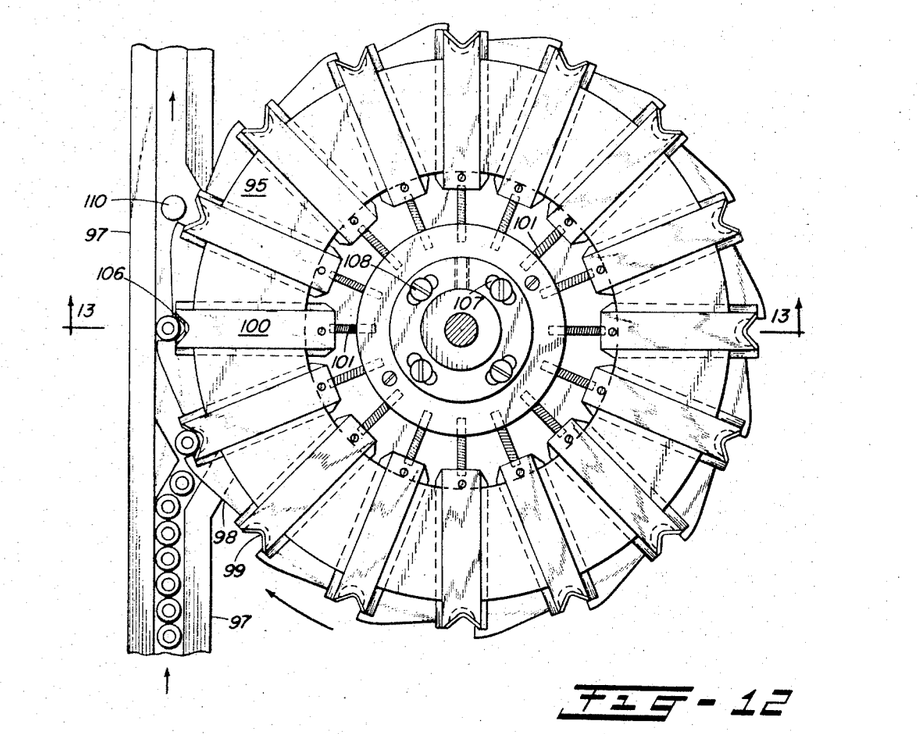
FIG. 12 is a plan view of the container orienting and clamping wheel of FIG. 7.
Figure 13:
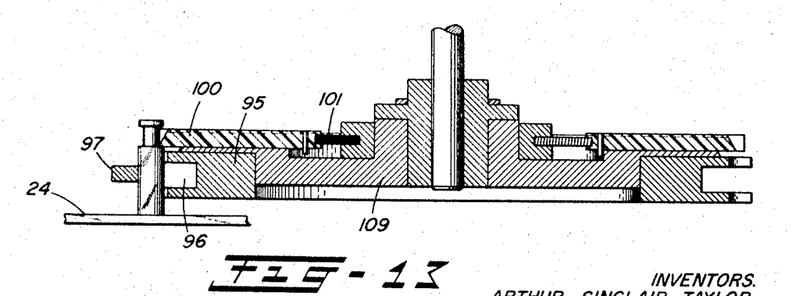
FIG. 13 is a section along the lines 13—13 of FIG. 12.

The stoppering operation just described requires means for holding a vial against tipping during the stoppering operation and keeping it properly aligned with the wheel 81. This mechanism is shown in FIGS. 12 and 13 and, in relation to the other elements of the stoppering mechanism, in FIG. 7. A wheel or plate 95 is located horizontally at the level of the vials as they move along. The wheel has a groove 96 which cooperates with a narrow vial fence member 97. The lower plate of the wheel, which turns below the fence 97, is provided with contours having beveled sections 98 and notches 99, the latter adapted to receive the lower portion of a single vial. The upper plate has a similar contour but the notched portions are in plungers 100 which are urged out by springs 101 (FIGS. 12 and 13). The relative vertical position of the plates and the fence 97 is shown on FIG. 7 and is adjustable by the supports 102 with slots 103 and bolts 104. This provides for fence positioning, and an adjustable bracket 105 permits adjustment of the height of the wheels 81 and 73.

Turning to FIG. 12, it will be seen that as the row of vials moves in the direction of the arrow the track forces them to the right where the neck of each vial is engaged by the notch on one of the plungers 100. The cam shaped contours 98 space the vials apart so that different vials are contacted by successive plungers. The spring pressure of the plunger in the position shown on FIG. 12 at 106 holds the neck of the vial tightly against one of the fences 97. It will be seen that in this position the fence has pushed the vial, and with it the plunger 100, somewhat in toward the center of the wheel, thus compressing the corresponding spring 101. It is at this position that the wheel 81 inserts the stopper into the vial. All of the wheels have to turn in synchronism and must be adjusted so that the wheel 81 and the wheel 95 come to the same position at the same time. Precise adjustment is made possible by slots 107 through which bolts 108 clamp into the plate 109 which drives the wheel. Very precise adjustment is made possible, which is maintained for any particular size of vial.

Figure 15:
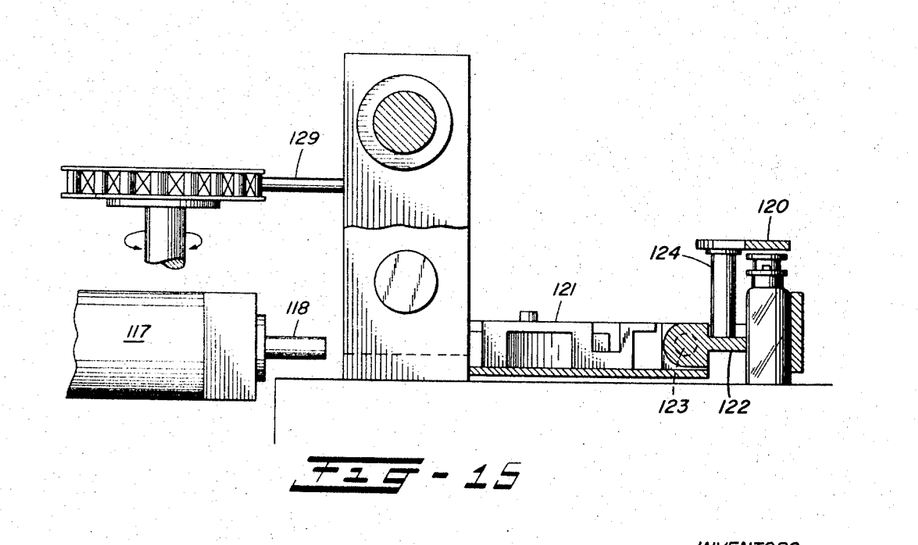
FIG. 15 is a similar view at a later stage of operation.
Figure 16:
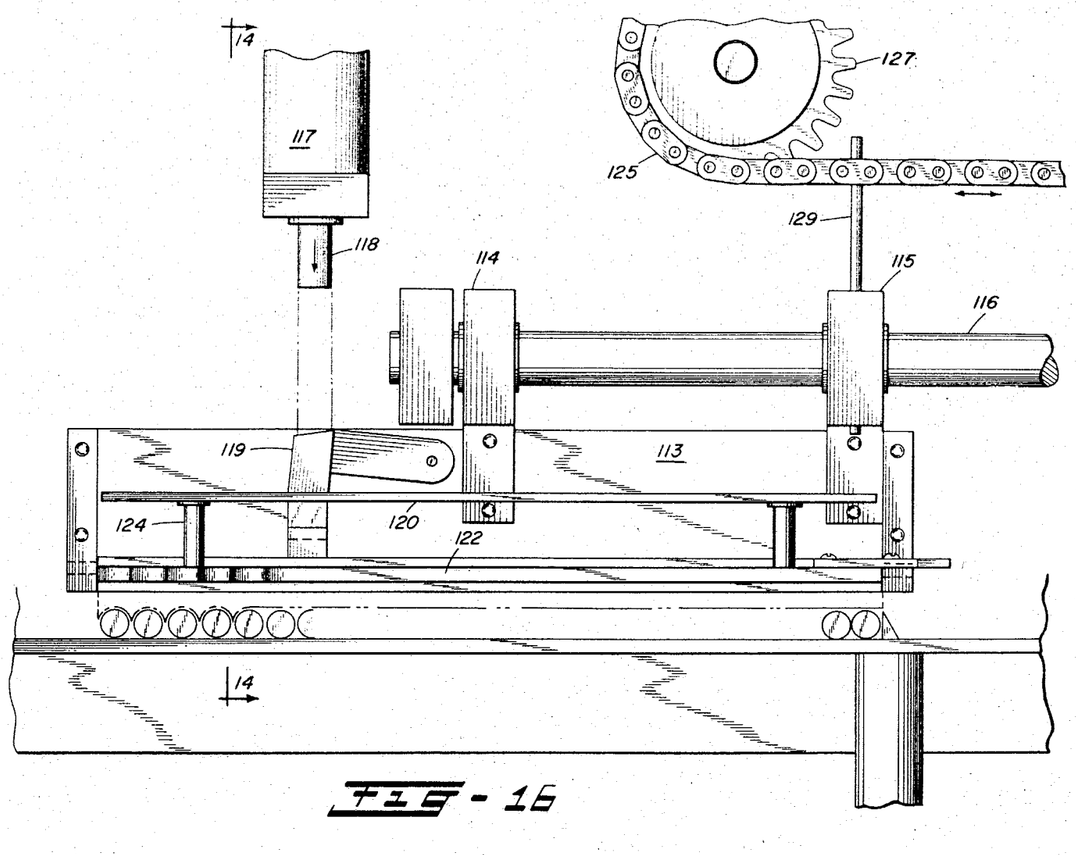
FIG. 16 is a plan view of the tray row transporter.

After stoppering, as the wheel 95 continues to turn, the stoppered vial, which is shown at 110 on FIG. 12, is now free to move along the track under the urging of the conveyor belt. The vials are spaced as they leave the stoppering station, which can be seen at the left in FIG. 1B, and the track now branches off, the vials being moved along the fence 111. As their movement along this fence is slower than the forward motion of the conveyor belt 24, they move up together, as is also shown in FIG. 1B. Now they pass an electric eye 112 which counts the number of vials until the number corresponding to the final packing tray 150 has been lined up. In the drawings this is shown as twenty-one. A signal is then given which initiates the transfer of the row of twenty-one vials to the final loading tray, which will now be described in conjunction with FIGS. 14 to 19. FIG. 16 shows the situation just after the twenty-first vial has been counted. It will be seen that there is a framework 113 carrying a rake, which will be described more particularly in conjunction with FIGS. 14 and 15. The framework slides on journals 114 and 115 which can move along a rod 116.

Figure 14:
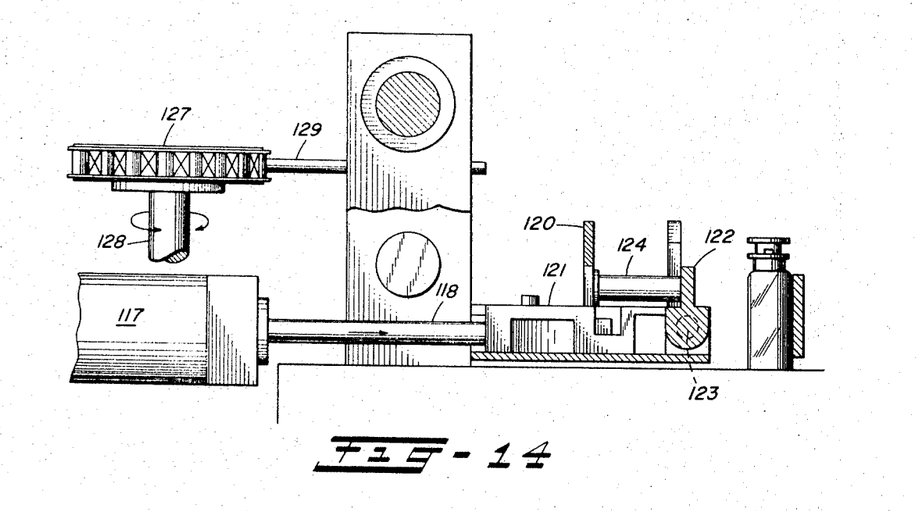
FIG. 14 is an elevation, partly in section, along the line 14—14 of FIG. 16.

The signal from 112 first actuates a pneumatic cylinder 117, the plunger of which, 118, is shown in its retracted position in full lines in FIG. 16 and in dashed lines in its extended position. As the plunger moves forward it strikes a hammer 119 which is pivoted on the framework 113. The hammer extends on underneath the top rail 120 of a pivotable rake. Turning to FIG. 14, which shows the plunger 118 in its extended position, an extension 131 of the hammer 119 strikes the lower rail 122 of the rake which is pivoted in the framework 113 at 123. The two rails 120 and 122 of the rake are connected together with posts 124 which can be seen clearly in FIGURE 16. The motion of the plunger 118 through the hammer 119 causes the lower rail 122 to pivot to a position 90° from that shown in FIG. 14. This position is shown in FIG. 15, which also shows the plunger 118 which has now been withdrawn. It will be seen in FIG. 15 that the upper rail 120 presses down on the tops of the stoppers of the row of twenty-one vials.

Figure 17:
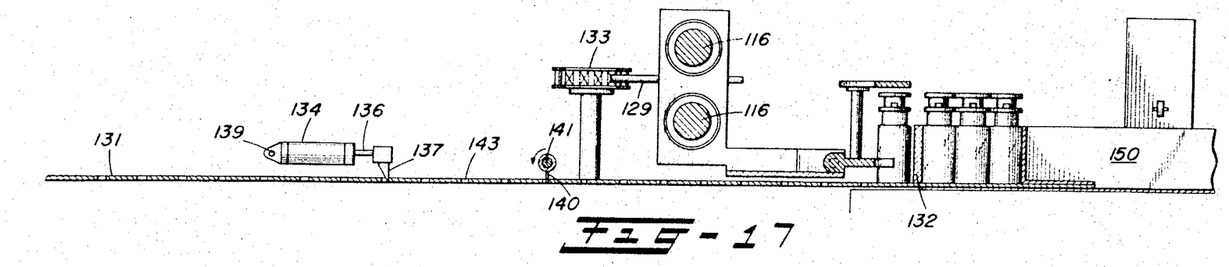
FIGS. 17 to 19 are elevations, partly in section, of three different positions of the tray row loading mechanism.

The same signal from the electric eye 112 starts a reversible motor (not shown), which moves the chain 125 in the direction of the arrow shown in FIG. 1B, a double arrow being shown in FIG. 16, to indicate that the motor is reversible and at another point, which will be described below, can turn the chain back to the position shown in FIGS. 1B and 16. The chain is protected by a cover 126, which is shown partly broken away in FIG. 1B and is omitted entirely from FIGS. 14 to 19. The chain 125 moves on sprockets 127 turned by a shaft 128 which in turn is driven by the reversible motor above referred to. As the chain 125 moves in the direction of the arrow in FIG. 1B, which is also to the right in FIG. 16, a pin 129 moves with it, and this pin extends through one of the links. The pin is rigidly attached to and forms part of the journal 115 and therefore as the chain moves the framework 113 moves with it. This causes the rake to move the twenty-one bottles until the row is opposite the already loaded rows 130 of the final unloading tray 150, which is shown in FIG. 1B. The figure shows the rake and row of bottles just as it has started to move. FIG. 17 shows the rake and the row when it has arrived in position opposite the tray 150. At this point the row of vials is resting on a platen 131 and is separated from the loaded rows 130 by a movable fence 132.

In FIG. 17 it will be seen that the pin 129 has traveled almost to the sprocket 133 at the other end of the chain 125. At this point the travel of the framework 113 trips a microswitch (not shown), the reversible motor stops, and a signal is given to two pneumatic cylinders 134 and 135, which are most clearly shown together on FIG. 1B. The cylinder 134 has a plunger 136 with a head having a triangular projection 137 (FIGS. 17 and 18), fitting into a hole or notch 143 on the platen 131. The whole apparatus is strongly reminiscent of a stylized woodpecker with the plunger 136 as his neck. As in the case of a real bird, the head can turn back from the platen 131, swiveling the cylinder 134 on a pivot 139. At this point the platen is locked against movement by a projection 140 on a cross shaft 141. The other end of the shaft is positioned on a platen framework 142 so that a projection can be struck by the plunger 138 of cylinder 135 (FIG. 1B). At the same instant the fence 132 is raised by a pneumatic cylinder (not shown), to the position shown in FIG. 18.

Figure 18:
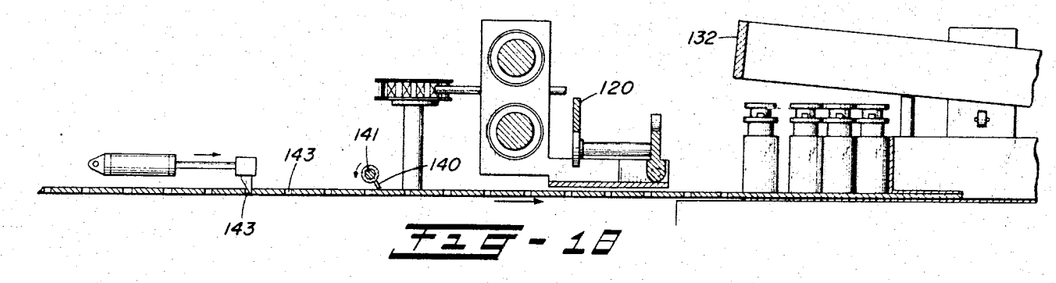
Figure 19:
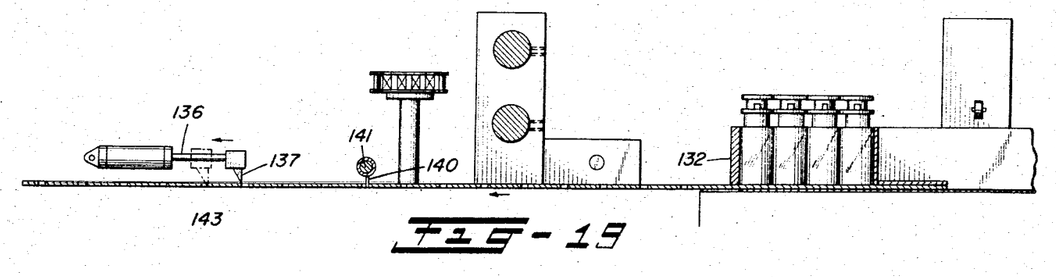

As both cylinders 134 and 135 have been energized, the woodpecker moves forward and the shaft 141 turns so that the platen 131 can move in the direction shown in FIG. 18. This position corresponds to the maximum movement of the plunger 136, and it will be seen that the rotation of the shaft 141 has moved the projection 140 up so that the platen was able to slide freely under it. Now the last bit of travel of the woodpecker's head moves the platen to a point where the projection 140 can fall into the next hole in the platen. These holes, shown at 143 on FIG. 1B and FIGS. 17 to 19, are spaced the width of a row of vials.

The raising of the fence 132 engages the upper rail 120 of the rake by a projection (not shown), flipping the rake back to its original position, which is shown in FIGS. 16 and 18. At the end of the platen movement, just after the position shown in FIG. 18, a microswitch (not shown), causes the fence 132 to drop to the position shown in FIG. 17, and the plunger 136 now moves back into its cylinder. This withdraws the platen slightly until the sloping lower part of the woodpecker's beak has raised the head sufficiently so that it clears the hole 143 in the platen. This is the position shown in FIG. 19 with the woodpecker's head slightly raised and ready to slide along the platen to finally drop into the next hole 143, as shown in dotted lines in FIG. 19. The slight backward movement of the platen 131 moves the loaded rows of vials 130 against the last loaded row so that they fit snugly against the fence 132. This is the position shown in FIG. 19. The same switch sends a signal to the reversible motor which turns the sprocket 127 and moves the chain 125 in the reverse direction, bringing the rake back to its original position where it is shown in FIG. 1B and FIGS. 14 to 16. The rake is now ready to receive another row of twenty-one vials and to repeat the above described operation on the next signal from the electric eye 112.

As row after row of vials is loaded onto the tray 150, the platen 131 moves successive holes to the right, as shown in FIG. 1B, until finally a projection or dog 144 strikes a microswitch 145. This causes the cylinder 135 to unlock the platen by turning the shaft 141 clockwise and the woodpecker head is slightly raised by pivoting the cylinder 134 by means which are not shown. The platen 131 is now free to slide and it is pulled back by the weight 146 which is connected to the platen by a cord 147 running over a pulley 148 in the platen framework 142. The platen is returned to its extreme position and is ready to receive the next row of vials. However, the tray 150 is now full and so the signal from the microswitch 145 stops the whole operation of the line, thus permitting the operator to remove the full tray 150, which is placed in a vacuum refrigerator if, as is the case with the slotted stoppers shown in the drawings, it is to be dried. Now the operator puts in an empty tray 150 and presses a start button (not shown), which starts up the production line going through the sequence of operations which has been described.

It will be noted that the holes 143 are spaced to permit the platen to slide on its guide rollers 149 one row of vials at a time. If vials of different diameters are to be run, another platen with suitably spaced holes is slid in and the operation proceeds as described above with the new size of vials.

We claim:

1. A stoppering mechanism for inserting stoppers into containers, comprising in combination loading means orienting stoppers in a predetermined position in a horizontal plane, transfer means for moving said stoppers individually and separately in the same position in the same horizontal plane, at least one vertical stopper wheel the periphery of which moves to a point just above and aligned with a container to be stoppered, the transfer means transferring individual stoppers to individual receiving stations on the periphery of the vertical wheel as each station reaches the horizontal plane of the transfer means, means for holding stoppers at the predetermined stations on the periphery of said wheels when transferred to each wheel, ejecting means for the stoppers and means for holding the ejecting means in retracted position as the stoppers are transferred into the positions on the periphery of the vertical wheel and maintaining the ejecting means in retracted position until the particular station reaches the bottom position of the vertical wheel, means for moving containers in synchronism with said vertical wheel, means for holding successive containers in a predetermined position aligned with a stopper at the bottom position of the vertical wheel, and means for moving the ejecting means from the retracted position to force the stopper into the container, the effective spacing between a container on the container moving means and the vertical wheel being adjustable whereby stoppers are periodically introduced into each container to a predetermined depth which is determined by the position of the lowest point of the vertical wheel periphery with respect to container mouth.

2. A stoppering means according to claim 1 in which the stoppers on the vertical wheels are held thereto by vacuum and the means are provided for breaking the vacuum on insertion of a stopper into a container in the bottom position of the vertical wheel.

3. A stoppering mechanism according to claim 2 in which the transfer mechanism is a horizontal wheel with recesses capable of receiving stoppers and provided with vacuum holding means in the recesses and synchronizing means whereby the horizontal wheel transfers the stoppers to the top of the periphery of the vertical wheel at the predetermined stations.

4. A stoppering mechanism according to claim 1 in which means are provided for maintaining the stoppers during travel through the stoppering mechanism in a sterile environment.

5. A stoppering mechanism according to claim 3 in which means are provided for maintaining the stoppers during travel through the stoppering mechanism in a sterile environment.

6. A stoppering mechanism according to claim 1 for stoppering containers to be subjected to freeze drying in which the stoppers are provided with vent passages when not completely inserted into the containers and whereby adjustment of the spacing of the vertical wheel from the top of containers is such as to allow insertion of the stoppers only sufficiently far into the containers to permit venting through the stopper during freeze drying.

7. A stoppering mechanism according to claim 6 in which the ejecting means in the means for holding stoppers at predetermined stations on the periphery of the vertical wheel comprises plungers in said wheel bearing on a cam whereby the effective radius of the wheel is changed by motion of the plungers.

8. A stoppering mechanism according to claim 1 in which the ejecting means in the means for holding stoppers at predetermined stations on the periphery of the vertical wheel comprises plungers in said wheel bearing on a cam whereby the effective radius of the wheel is changed by motion of the plungers.

References Cited

UNITED STATES PATENTS

| 2,600,138 | 6/1952 | Tesch | 53—304 X |
| 3,022,619 | 2/1962 | Strong et al. | 53—106 |
| 3,289,383 | 12/1966 | Foss | 53—110 X |

FOREIGN PATENTS 392,270   5/1933   Great Britain.

THERON E. CONDON, *Primary Examiner.*

R. L. SPRUILL, *Assistant Examiner.*

U.S. Cl. X.R.

53—62, 282, 304, 319; 141—234; 221—175